United States Patent [19]
Yoshikawa

[11] Patent Number: 5,913,298
[45] Date of Patent: Jun. 22, 1999

[54] VALVE TIMING SYSTEM FOR ENGINE

[75] Inventor: Masaaki Yoshikawa, Iwata, Japan

[73] Assignee: Yamaha Hatsudoki Kabushiki Kaisha, Iwata, Japan

[21] Appl. No.: 08/999,450

[22] Filed: Dec. 29, 1997

[30] Foreign Application Priority Data

Dec. 26, 1996 [JP] Japan .................................. 8-347170

[51] Int. Cl.⁶ .............................. F01L 1/34; F02B 31/00
[52] U.S. Cl. ...................................... 123/306; 123/90.15
[58] Field of Search ................................... 123/306, 308, 123/90.15

[56] References Cited

U.S. PATENT DOCUMENTS

| | | | |
|---|---|---|---|
| 4,413,598 | 11/1983 | Tsutumi .................................. | 123/306 |
| 4,827,883 | 5/1989 | Khalighi et al. ........................ | 123/306 |
| 4,995,351 | 2/1991 | Ohkubo et al. ....................... | 123/90.15 |
| 4,998,518 | 3/1991 | Mitsumoto ............................... | 123/306 |
| 5,421,308 | 6/1995 | Hitomi et al. ........................ | 123/90.15 |
| 5,494,008 | 2/1996 | Ohkawa et al. ....................... | 123/90.15 |
| 5,551,392 | 9/1996 | Yamaji et al. ........................... | 123/306 |
| 5,640,941 | 6/1997 | Hazen et al. ............................. | 123/306 |
| 5,758,612 | 6/1998 | Tsuzuki .................................. | 123/90.16 |

*Primary Examiner*—Thomas N. Moulis
*Attorney, Agent, or Firm*—Knobbe, Martens, Olson & Bear LLP

[57] ABSTRACT

An internal combustion engine having a variable valve timing mechanism, a throttle valve and a flow control valve for controlling the generation of turbulence in a combustion chamber. The control valve is operated so as to generate turbulence in the combustion chamber under low- and mid-range performance. When this turbulence is generated, the timing of opening of the intake valve is retarded. Also, the throttle valve is opened more fully when the control valve is closed so as to control the engine speed and maintain the desired engine speed.

19 Claims, 3 Drawing Sheets

VALVE TIMING SYSTEM FOR ENGINE

BACKGROUND OF THE INVENTION

This invention relates to an internal combustion engine and more particularly to an improved valve timing and induction system for an internal combustion engine.

As is well known, internal combustion engines are utilized for a wide variety of purposes. Many of these applications, such as when operating motor vehicles, demand the engine operate over widely varying load and speed ranges. This varying loading and speed of operation for the engine gives rise to substantial difficulties in engine design. That is, an engine that is designed to run at a particular speed and load may be inefficient or not run as well as desired at other speeds and loads. Therefore, a wide variety of techniques have been employed in order to try to improve engine running throughout its speed and load range.

One type of system employed to improve engine performance under varying conditions is the use of variable valve timing. That is, the timing of opening and closing of either or both of the exhaust and intake valves may be varied during engine running. By doing this, the optimum valve timing for each condition can be chosen.

In connection with the air induction system for an engine it has also been found that in the introduction of turbulence into the combustion chamber can be very effective in improving flame propagation and combustion under low speed/low load running conditions. However, the type of turbulence generating devices frequently employed restrict airflow and can thus sacrifice high speed performance. Therefore, it has been proposed to use devices such as tumble valves in the induction system that can be controlled to induce turbulence under some running conditions and to permit unrestricted air flow under other running conditions.

It has been found advantageous to combine the use of variable valve timing and flow control in the same engine. However, and in accordance with an important feature of this invention, it has been discovered that these systems have an interrelated operation that can be utilized to obtain optimum running if the control of the valve timing and of the flow control valve are coordinated with each other in a proper sequence.

Systems have also been proposed in which there is not a direct mechanical connection between the accelerator pedal or other operator controlled speed and load control and the throttle valve or other controlling system of the engine. These systems are frequently referred to as "fly by wire" systems.

In connection with the use of flow controlling valves, it has been also found that the position of the flow control valve can change the speed at which the engine is operating all other things being equal. Therefore, it is possible to utilize in a fly by wire system a control where the engine speed can be varied by holding the throttle valve in a fixed position and varying the position of the flow control valve. This also can permit the throttle valve to be opened wider than would be normal under the conditions and thus improve acceleration.

It is, therefore, a still further object of this invention to provide an engine having a speed control wherein the speed or output of the engine are varied by controlling both the throttle valve and the flow control valve.

Finally, where engines have the capability of adjusting both the timing of the intake and exhaust valves, these can be operated either together with each other or in some sequence.

It is a further object of the invention, therefore, to provide the optimum range of adjustment for the intake valve and for the exhaust valve independently of each other when both are independently controlled.

SUMMARY OF THE INVENTION

A first feature of the invention is adapted to be embodied in an internal combustion engine having a combustion chamber and an induction system for delivering at least an air charge to the combustion chamber. The communication of the induction system with the combustion chamber is controlled by an intake valve that is operated through a variable valve timing mechanism for controlling the time of opening and closing of the intake valve. A flow control valve is provided in the induction system for altering the direction of air flow into the combustion chamber under at least some running conditions. In accordance with this feature of the invention, when the intake valve timing is retarded, the flow control valve is positioned in a direction for changing the direction of air flow into the combustion chamber.

Another feature of the invention is adapted to be embodied in an engine having a combustion chamber and an induction system for delivering at least an air charge to the combustion chamber. The flow through the induction system is controlled by a throttle valve. In addition, a flow control valve is positioned in the induction system in proximity to the combustion chamber for selectively altering the direction of charge flow into the combustion chamber. In accordance with this feature of the invention, the engine speed is controlled by controlling both the position of the flow control valve and the throttle valve and wherein when the flow control valve is in a flow redirecting position, the opening of the throttle valve is increased.

A final feature of the invention is adapted to be embodied in an internal combustion engine having a combustion chamber and an induction system and an exhaust system for providing, respectively, flow into the combustion chamber and flow out of the combustion chamber. Intake and exhaust valves control the communication of the induction system and the exhaust system with the combustion chamber, respectively. The timing of opening and closing of both the intake valve and the exhaust valve can be adjusted. The adjustment range for changing the timing of the intake valve is arranged to be more than 50° of engine output shaft angle while the adjustment range for the exhaust valve is arranged to be less than 60° of the engine output shaft angle.

DETAILED DESCRIPTION OF THE PREFERRED EMBODIMENTS OF THE INVENTION

Figure 1:
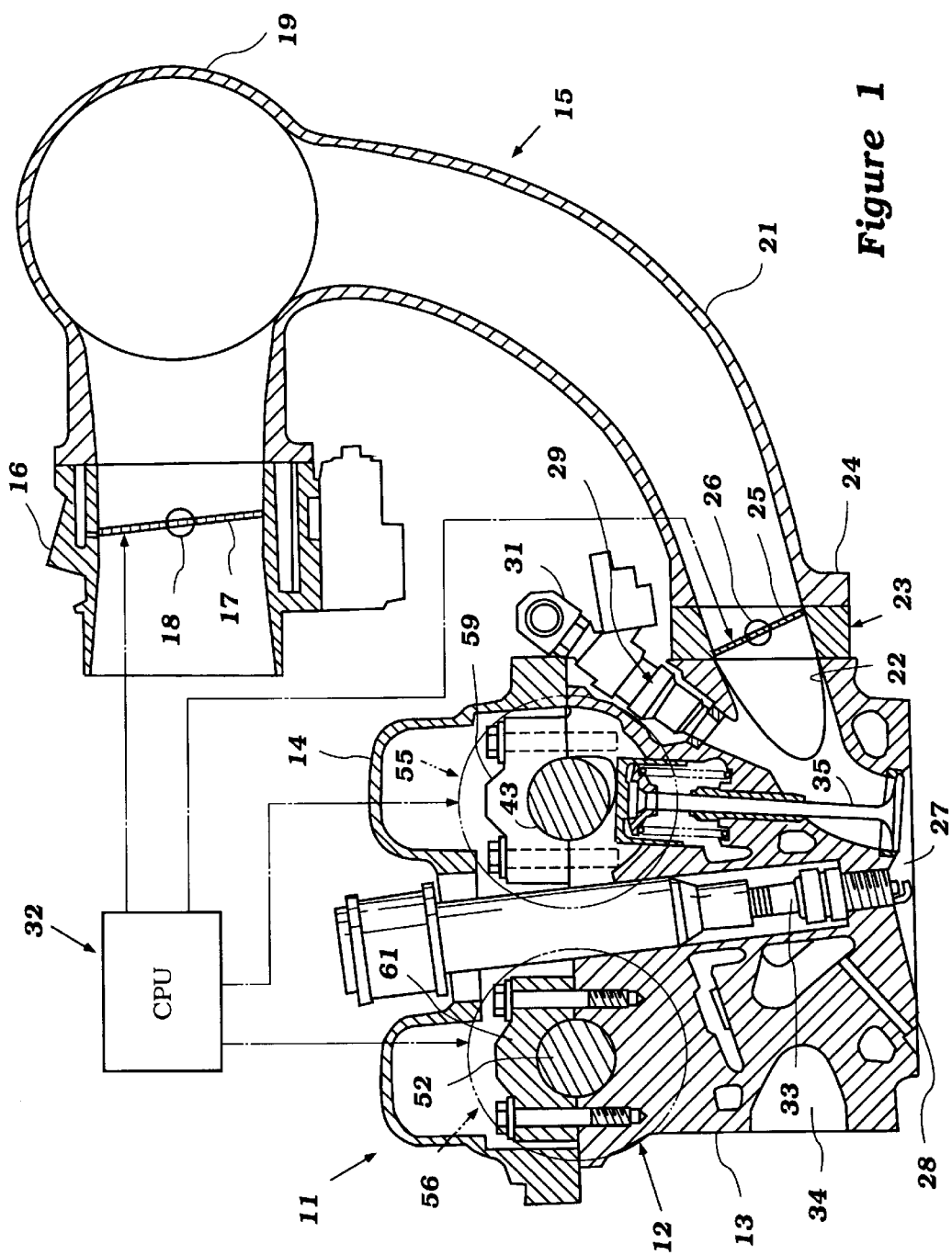
FIG. 1 is a partial view of a portion of an internal combustion engine embodying the invention with parts shown in cross section and other parts shown schematically.

Referring now in detail to the drawings and initially primarily to FIG. 1, a portion of an internal combustion engine constructed in accordance with an embodiment of the invention is identified generally by the reference numeral 11. Since the invention deals primarily with the valve actuating mechanism and the induction system and since the engine is of the twin overhead camshaft type, only the cylinder head assembly of the engine and certain components associated with it including portions of the charge forming system are illustrated. The cylinder head assembly, indicated generally by the reference numeral 12, is comprised of a main cylinder head member 13 and an attached cam cover 14.

The right-hand side of the engine as viewed in FIG. 1 comprises the intake side and a portion of the induction system, indicated generally by the reference numeral 15 is associated therewith. This induction system 15 includes a throttle body 16 which draws atmospheric air through a suitable inlet device which may include a silencing and filtering mechanism and which is not shown since any conventional structure may be employed. A throttle valve 17 is rotatably journaled in the throttle body 16 on a throttle valve shaft 18.

The throttle body 16 delivers air to a plenum chamber 19 from which a plurality of individual runners 21 extend. Each runner serves a respective Siamese-type intake port 22 formed in the cylinder head member 13.

In order to improve engine performance, a flow control valve assembly, indicated generally by the reference numeral 23 is sandwiched between a flange 24 of the manifold runners 21 and the cylinder head 13. This control valve assembly 23 includes a tumble valve 25 that is rotatably supported by a control valve shaft 26. By opening and closing the valve 25, either a tumble motion may be generated in the associated combustion chamber or the charge may be permitted to enter the combustion chamber without substantial restriction.

The charge which is delivered to the cylinder head intake passage 22 is transferred through intake valve arrangements, to be described shortly, into a combustion chamber. This combustion chamber is formed in part by a recess 27 in a lower surface 28 of the cylinder head. The cylinder head surface 28 is affixed in closing relationship to a cylinder block, which is not illustrated and which may be of any known type. The cylinder head recesses 27 cooperate with the associated cylinder bores and pistons to form the engine combustion chambers.

An electrically operated fuel injector, indicated generally by the reference numeral 29 is mounted in the cylinder head 13 and delivers fuel into the intake passage 22. A fuel rail 31 supplies fuel to the fuel injector 29 associated with each of the engine combustion chambers. Fuel is supplied to the fuel rail 31 through a suitable fuel supply system which may be of any known type.

The fuel injector 29 is controlled along with other components of the engine by a CPU, indicated generally by the reference numeral 32, and which is shown only schematically. The CPU 32 may control the operation of the throttle valve 17 and the flow control valve 26 as shown by the schematic broken lines in FIG. 1. The strategy by which this is done will be described later.

A spark plug 33 is mounted in the cylinder head 13 and has its spark gap exposed in the cylinder head recess 27. The spark plugs 33 may be fired by a suitable ignition system which may also be controlled by the CPU 32.

The burnt charge which results from the firing of the spark plug 33 is discharged through one or more exhaust passages 34 formed in the side of the cylinder head 13 opposite from the intake passages 22. The flow into the exhaust passages 34 is controlled by a valve mechanism which will be described shortly.

An exhaust manifold (not shown) is affixed to the exhaust side of the cylinder head 13 for collecting the exhaust gases from the exhaust passages 34 and delivering them to the atmosphere through any suitable exhaust system. For the reasons already noted, this exhaust system is not shown and any known type may be employed in connection with the engine.

The valve mechanism which operates so as to control the flow through the intake passages 22 and the exhaust passages 34 and the interchange of intake and exhaust charge to and from the combustion chamber recesses 27 will now be described by primary reference to FIGS. 1 and 2.

In the illustrated embodiment, the engine 11 is of the 5-valve per cylinder type. Although this type of valve arrangement is illustrated and will be described, it should be readily apparent that the invention can be utilized with a wide variety of types of valve mechanisms and can, in fact, be utilized with engines that do not have overhead valves. Of course, the invention has maximum utility in conjunction with the valve arrangement which will be described.

The 5-valve per cylinder arrangement is comprised of a three intake valves, each indicated by the reference numeral 35 and two exhaust valves, each indicated by the reference numeral 36. The intake valves 35 include a center intake valve which is shown in FIG. 1 and which is disposed between a pair of side intake valves, one of which is shown in FIG. 2. Preferably, these valves are disposed so that the center intake valve is disposed further from a plane containing the axis of rotation of the engine crankshaft and the axis of the cylinder bores with which the cylinder head recesses 27 cooperate. The side intake valves, on the other hand, are positioned closer to this plane and may in fact extend over it. The specific relationship can be varied without departing from the invention.

The intake valves 35 have their stem portions slidably supported within guides 37 that are suitably affixed in the main cylinder head member 13 and which form a portion of the cylinder head assembly 12. The intake passage 22 is a Siamese-type and branches into individual branches that terminate at intake ports 38 which terminate in valve seats 39 which are valved by the heads of the respective intake valves 35 in a well known manner.

Each intake valve 35 is urged toward a closed position by a coil compression spring 41. This spring acts against a keeper retainer assembly 42 that is affixed to the stem of the valve 35 and against the cylinder head 13 for urging the valves 35 to their closed positions.

An intake camshaft, indicated generally by the reference numeral 43, is journaled within the cylinder head 13 in a manner which will be described shortly. This intake camshaft 43 is also driven by the engine crankshaft in a mechanism which will be described. The intake camshaft 43 has a plurality of cam lobes 44 which are associated with thimble tappets 45 for actuating the valves 35 in a well known manner.

Figure 2:
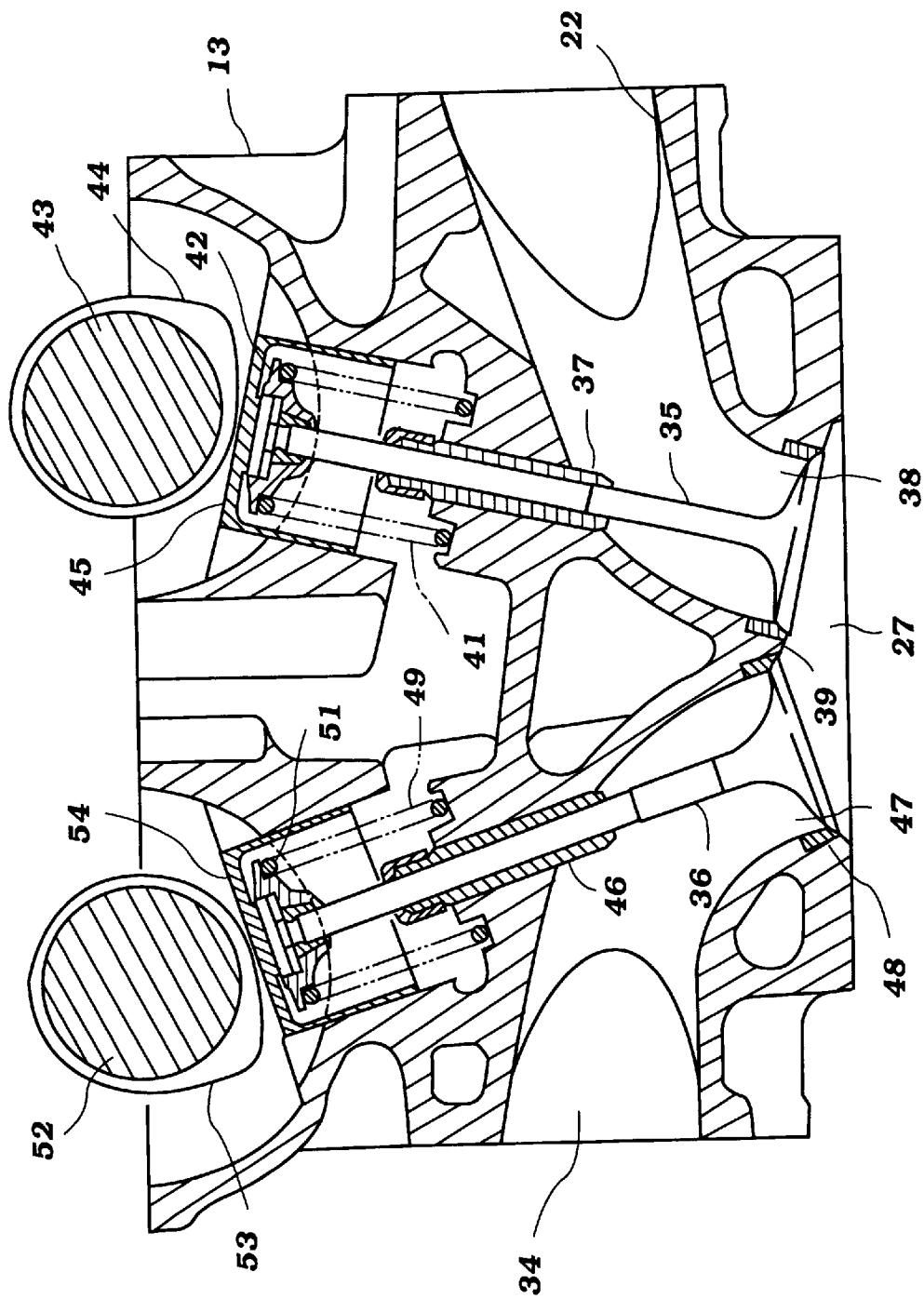
FIG. 2 is an enlarged cross-sectional view taken along a plane parallel to that of FIG. 1 and shows in more detail the valve actuating mechanism for the engine.

Continuing to refer primarily now to FIG. 2, the two exhaust valves 36 are disposed in side-by-side relationship. Like the intake valves 35, the exhaust valves 36 are slidably supported in the cylinder head member 13 by valve guides 46. The heads of the valves 36 control exhaust ports 47 which are formed in the cylinder head 13 in communication with the cylinder head recessed 27 and which terminate at exhaust valve seats 48. Again, this is a type of construction that is well known in the art.

The exhaust valves 36 are urged to their closed positions by coil compression springs 49. These coil compression springs 49 act against keeper retainer assemblies 51 affixed to the stems of the exhaust valves 35 and the cylinder head 13.

An exhaust camshaft 52 is journaled in the cylinder head assembly 12 in a manner which will also be described. The exhaust camshaft 52 rotates about an axis that is parallel to the axis of the intake camshaft 43.

The exhaust camshaft 52 has a plurality of cam lobes 53. Each of these cam lobes 53 cooperates with a respective thimble tappet 54 for controlling the opening of the associated exhaust valve 36 in a manner which is also well known in this art.

The intake and exhaust cam shafts 43 and 52 are driven from the crankshaft of the engine through a timing drive of any known type. Preferably, this timing drive includes a pair of variable valve timing mechanisms 55 and 56 that are interposed between this drive and the cam shafts 43 and 52. This drive is of a type which can be hydraulically actuated so as to vary the timing of the opening and closing of both the intake valves 35 and the exhaust valves 36.

A type of timing drive which may be utilized in conjunction with the invention is described in the copending application entitled "Variable Valve Timing Arrangement for Engine," filed in the name of the inventor hereof and Hirano Takahashi, Ser. No. 08/988884, filed concurrently herewith and assigned to the assignee hereof. Since the type of variable valve timing mechanism employed forms no part of the invention, although the control strategy for it does, further description of that drive is not believed to be necessary to permit those skilled in the art to practice the invention.

As should be apparent from the foregoing description, the invention herein relates to the strategy by which the throttle valve 17 and flow control or tumble valve 25 are controlled along with the strategy by which the timing of the opening of the intake valves 35 and exhaust valves 36 is controlled by the variable valve timing mechanisms 55 and 56 under the control of the CPU. These mechanisms are controlled by the CPU 32 as shown by the phantom lines in FIG. 1.

Basically, the system operates on a fly by wire type of arrangement wherein the CPU 32 controls the opening of the throttle valve 17 and the flow control or tumble valve 25. This strategy will now be described.

Under low speed/low load conditions, the induction system 15, which is generally free flowing and unrestricted does not generate sufficient turbulence in the combustion chamber so as to provide the desired, rapid rate of claim propagation. Therefore, when operating at low loads and low speeds and proceeding into the mid-range conditions, the flow control valve 25 is moved toward its closed or flow restricting position as shown in the solid line view of FIG. 1.

In this position, a cutout in the throttle valve causes the flow to enter the combustion chamber at a higher velocity and in a direction that is generally toward the opposite side of the cylinder bore from which the intake ports 38 are positioned. This generates a type of swirling in the combustion chamber that is generally referred to as "tumble".

Tumble is a particularly desirable type of swirl because unlike conventional circumferential swirls, it does not dissipate as the piston approaches top dead center. Rather, this tumble motion is accelerated since the charge travels through progressively smaller distances as the piston approaches top dead center and thus is accelerated.

Because the closure of the tumble valve 25 causes a restriction in the flow, it is also possible to open the throttle valve 17 to a greater extent than were the flow control valve not employed. This has several advantages, as will be noted.

It should be noted that the control strategy for the CPU includes a number of sensors including an operator controlled load demand device such as an accelerator pedal or the like. However, this accelerator pedal or throttle control is not mechanically coupled to the throttle valve 17. Rather, the throttle valve 17 is opened by a servo motor.

By opening the throttle valve 17 to a greater extent than would be necessary were the tumble valve 25 not employed, it is possible to improve acceleration. This is because the air flow is more unrestricted and it is not necessary to subsequently open the throttle valve when more engine power is demanded. Rather, the tumble valve 25 may be progressively opened and the throttle valve 17 opens subsequently.

Figure 3:
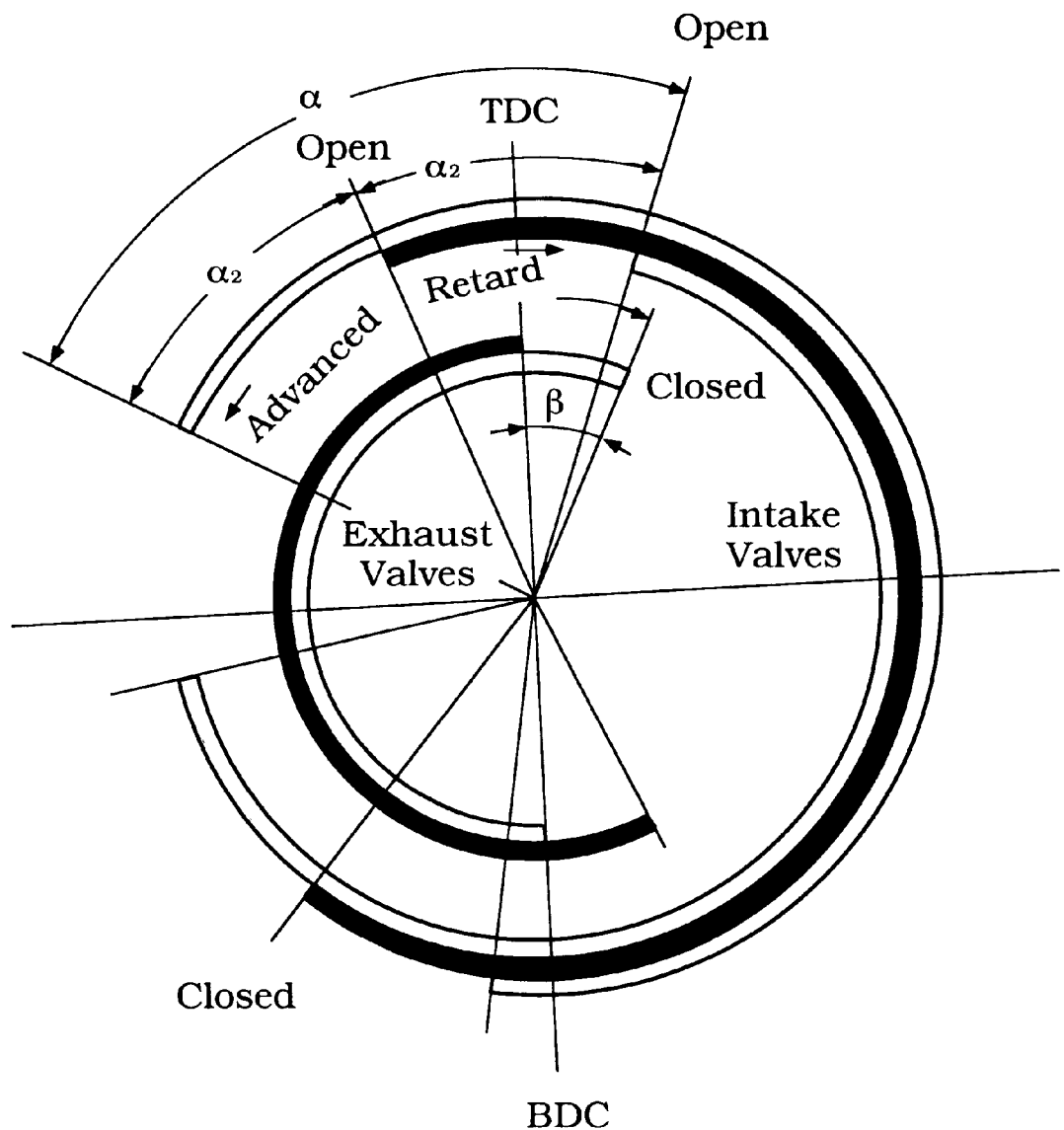
FIG. 3 is a graphical view showing the timing of the intake and exhaust valve opening and the range in which they can be adjusted in accordance with an embodiment of the invention.

The control of the tumble valve 25 and throttle valve 27 is also related to the strategy by which the variable valve timing mechanisms and timing of opening and closing of the intake valves 35 and exhaust valves 36 is controlled. This may be understood by reference to FIG. 3, which is a timing diagram and which shows the varying valve timings.

As may be seen in this figure, which represents a single rotation of the cam shafts which, in turn, corresponds to two rotations of the crankshaft. It will be seen that with conventional variable valve timing mechanisms the timing of opening of the intake valve may be varied from a point after top dead center, as shown by the shaded line curve to a point before top dead center indicated by the point $\alpha_2$. However, in accordance with the invention, the intake valve may be opened at a further advanced point which is advanced by the angle $\alpha_1$ greater than the angle $\alpha_2$. As a result, the total variation and opening of the intake valve can be varied through the angle a which is, preferably greater than 50° in accordance with the invention. Of course, the closing of the intake valve is advanced or retarded in the same direction.

The exhaust valve also has its timing varied as shown between the solid line curves and the broken line curves with a total range of adjustment indicated by the angle $\beta$ which is preferably less than 60° of crank angle.

In accordance with the strategy, when operating at low speeds and low loads and when the tumble valve 25 is in its flow redirecting or restricting position, then the intake valve is adjusted in the retarded direction. As has also been noted, when the control valve 25 is closed, the throttle valve 17 is opened more widely than normal.

Thus, this type of arrangement has been found to provide extremely good combustion and characteristics at low speed/low load conditions and also has been found to improve performance throughout the entire load and speed ranges. Because of this, it is also possible to use an even greater advance of intake valve timing under high speed/high load conditions so as to significantly improve the power output.

Thus, as the load demand increases, the following procedure results. First, the control valve or tumble valve 25 is progressively opened and, at the same time, the timing of the intake and exhaust valves may be advanced more than previously possible in the case of the intake valve at least. Also, the throttle valve will be progressively opened but its opening is advanced initially and continued opening does not occur until after the control valve begins to be opened.

Of course, the foregoing description is that of the preferred embodiment of the invention and various changes and modifications may be made without departing from the spirit and scope of the invention, as defined by the appended claims.

I claim:

1. An internal combustion engine having a combustion chamber, an induction system for controlling the flow of at least air charge to said combustion chamber, an intake valve for controlling the communication of said induction system with said combustion chamber and driven in timed relationship with an engine output shaft, a variable valve timing mechanism for adjusting the timing of opening and closing of said intake valve, a flow control valve positioned in said induction system in proximity to said intake valve and movable from a first position wherein the flow into said combustion chamber is restricted and redirected and a second position wherein the flow into said combustion chamber is in a different direction and is substantially unrestricted, and control means for moving said control valve to its first position and for reducing the degree of opening of said intake valve.

2. An internal combustion engine as set forth in claim 1, wherein the flow control valve induces a tumble motion in the combustion chamber when in its first position.

3. An internal combustion engine as set forth in claim 2, wherein there is provided a throttle valve for controlling the flow of air through the induction system upstream of the flow control valve.

4. An internal combustion engine as set forth in claim 3, wherein means are provided for controlling the position of the flow control valve and the throttle valve so that when said flow control valve is in its first position, said throttle valve is opened to a greater extend than necessary to control the engine speed.

5. An internal combustion engine as set forth in claim 4, wherein the means for controlling the flow control valve and the throttle valve maintains said flow control valve in its first position and said throttle valve in a partially opened position and the speed is increased by first opening the flow control valve and thereafter opening the throttle valve.

6. An internal combustion engine as set forth in claim 2, further including an exhaust system for discharging a burnt charge from the combustion chamber, an exhaust valve for controlling the communication of said combustion chamber with said exhaust system, a variable valve timing mechanism for controlling the opening and closing of said exhaust valve in timed relationship to the engine output shaft and for varying the timing of opening and closing of said exhaust valve.

7. An internal combustion engine as set forth in claim 6, wherein the intake valve variable valve timing mechanism permits adjustment of the beginning of opening of the intake valve to a range greater than 50° of the engine output shaft angle and the variable valve timing mechanism for the exhaust valve permits adjustment of the beginning of opening of said exhaust valve to a range that is less than 60° of the engine output shaft angle.

8. An internal combustion engine as set forth in claim 7, wherein there is provided a throttle valve for controlling the flow of air through the induction system upstream of the flow control valve.

9. An internal combustion engine as set forth in claim 8, wherein means are provided for controlling the position of the flow control valve and the throttle valve so that when said flow control valve is in its first position, said throttle valve is opened to a greater extend than necessary to control the engine speed.

10. An internal combustion engine as set forth in claim 9, wherein the means for controlling the flow control valve and the throttle valve maintains said flow control valve in its first position and said throttle valve in a partially opened position and the speed is increased by first opening the flow control valve and thereafter opening the throttle valve.

11. An internal combustion engine having a combustion chamber, an induction system for delivering at least an air charge to said combustion chamber, said induction system comprising at least one intake valve for controlling the communication of said induction system with said combustion chamber in timed relationship to the engine output shaft, a throttle valve for controlling the flow of air through said induction system, and a flow control valve positioned in said induction system in proximity to said intake valve moveable from a first position for redirecting the flow charge into said combustion chamber and for restricting the flow into said combustion chamber under some running conditions to a second position wherein the flow into said combustion chamber is neither restricted nor redirected, and means for controlling the position of said flow control valve and said throttle valve so that when said flow control valve is moved from said second position towards said first position, said throttle valve is opened to a greater extent than necessary to control the engine speed.

12. An internal combustion engine as set forth in claim 11, wherein the means for controlling the flow control valve and the throttle valve maintains said flow control valve in its first position and said throttle valve in a partially opened position and the speed is increased by first opening the flow control valve and thereafter opening the throttle valve.

13. An internal combustion engine as set forth in claim 12, wherein the flow control valve induces a tumble motion in the combustion chamber when in its first position.

14. An internal combustion engine having a combustion chamber, an induction system for delivering at least an air charge to said combustion chamber, an intake valve for controlling the communication of said intake passage with said combustion chamber, a variable valve timing mechanism for controlling the opening and closing of said intake valve in relation to an output shaft of said engine shaft and for varying the timing of opening and closing of said intake valve, an exhaust system for discharging a burnt charge from said combustion chamber, an exhaust valve for controlling the communication of said combustion chamber with said exhaust system, a variable valve timing mechanism for controlling the opening and closing of said exhaust valve in timed relationship to said engine output shaft and for varying the timing of opening and closing of said exhaust valve, said intake valve variable valve timing mechanism permitting adjustment of the beginning of opening of said intake valve to a range greater than 50° of the engine output shaft angle, said variable valve timing mechanism for said exhaust valve permitting adjustment of the beginning of opening of said exhaust valve to a range that is less than 60° of the engine output shaft angle.

15. An internal combustion engine as set forth in claim 14, further including a flow control valve positioned in the induction system in proximity to the intake valve and movable from a first position wherein the flow into the combustion chamber is restricted and redirected and a second position wherein the flow into said combustion chamber is in a different direction and is substantially unrestricted, and control means for moving said control valve to its first position and for reducing the degree of opening of said intake valve.

16. An internal combustion engine as set forth in claim 15, wherein the flow control valve induces a tumble motion in the combustion chamber when in its first position.

17. An internal combustion engine as set forth in claim 16, wherein there is provided a throttle valve for controlling the flow of air through the induction system upstream of the flow control valve.

18. An internal combustion engine as set forth in claim 17, wherein means are provided for controlling the position of the flow control valve and the throttle valve so that when said flow control valve is in its first position, said throttle valve is opened to a greater extend than necessary to control the engine speed.

19. An internal combustion engine as set forth in claim 18, wherein the means for controlling the flow control valve and the throttle valve maintains said flow control valve in its first position and said throttle valve in a partially opened position and the speed is increased by first opening the flow control valve and thereafter opening the throttle valves.

* * * * *